United States Patent
Xu et al.

(10) Patent No.: US 11,445,163 B2
(45) Date of Patent: Sep. 13, 2022

(54) TARGET IMAGE ACQUISITION SYSTEM AND METHOD

(71) Applicant: ORBBEC INC., Guangdong (CN)

(72) Inventors: Xing Xu, Shenzhen (CN); Lianghong Zhong, Shenzhen (CN); Xu Chen, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 0 days.

(21) Appl. No.: 17/000,795

(22) Filed: Aug. 24, 2020

(65) Prior Publication Data

US 2020/0389642 A1    Dec. 10, 2020

Related U.S. Application Data

(63) Continuation of application No. PCT/CN2018/099303, filed on Aug. 8, 2018.

(30) Foreign Application Priority Data

Mar. 31, 2018 (CN) .......................... 201810278539.1

(51) Int. Cl.
    *H04N 13/254*     (2018.01)
    *H04N 13/25*     (2018.01)
    *H04N 13/296*     (2018.01)

(52) U.S. Cl.
    CPC ........... *H04N 13/254* (2018.05); *H04N 13/25* (2018.05); *H04N 13/296* (2018.05)

(58) Field of Classification Search
    CPC .... H04N 13/254; H04N 13/296; H04N 13/25; H04N 5/332; H04N 9/04553;
(Continued)

(56) References Cited

U.S. PATENT DOCUMENTS 5,940,139 A * 8/1999 Smoot .................... H04N 5/272
                                                                           348/584
8,436,308 B2    5/2013   Choe et al.
(Continued)

FOREIGN PATENT DOCUMENTS

CN        101339607 A     1/2009
CN        101477631 A     7/2009
(Continued)

OTHER PUBLICATIONS

PCT International Preliminary Report on Patentability dated Oct. 15, 2020, issued in related International Application No. PCT/CN2018/099301, with English translation (9 pages).
(Continued)

*Primary Examiner* — Susan E. Torgerson
(74) *Attorney, Agent, or Firm* — Sheppard Mullin Richter & Hampton LLP

(57) ABSTRACT

A system and method for obtaining a target image are provided. The system includes: a floodlight illumination source configured to provide illumination of a first wavelength for a target area; a first acquisition camera configured to acquire a target floodlight image of the first wavelength of the target area; a structured light projector configured to project a structured light image of a second wavelength to the target area; a second acquisition camera configured to acquire the structured light image of the target area; and a processor, connected to the floodlight illumination source, the first acquisition camera, the structured light projector, and the second acquisition camera, and configured to: acquire the target floodlight image and the structured light image; recognize a foreground target in the floodlight image; and extract a target structured light image based on a relative position relationship between the first acquisition camera and the second acquisition camera.

16 Claims, 5 Drawing Sheets

(58) Field of Classification Search
CPC ........ H04N 5/343; H04N 13/239; H04N 5/33; H04N 13/271; G01B 11/25; G06K 9/00221; G06K 9/00201; G06K 9/2027; G06K 9/2018; G06T 7/11; G06T 7/194; G06T 7/521; G06T 3/4076; G06T 7/557; G06T 2207/10028
USPC .......................................................... 348/47
See application file for complete search history.

(56) References Cited

U.S. PATENT DOCUMENTS

| | | | |
|---|---|---|---|
| 9,619,885 | B2 | 4/2017 | Kang et al. |
| 9,906,774 | B2 | 2/2018 | Cho et al. |
| 9,953,428 | B2 | 4/2018 | Gren et al. |
| 10,104,295 | B2 | 10/2018 | Fukushima |
| 2011/0102547 | A1 | 5/2011 | Sul et al. |
| 2012/0327430 | A1 | 12/2012 | Lee et al. |
| 2014/0003722 | A1 | 1/2014 | Aviv et al. |
| 2014/0267602 | A1 | 9/2014 | Tzur et al. |
| 2014/0307952 | A1 | 10/2014 | Sweeney et al. |
| 2015/0130908 | A1 | 5/2015 | Kang et al. |
| 2015/0279042 | A1 | 10/2015 | Michot |
| 2017/0070726 | A1* | 3/2017 | Goldentouch ....... H04N 13/257 |
| 2017/0142312 | A1* | 5/2017 | Dal Mutto ........... H04N 13/239 |
| 2018/0059225 | A1* | 3/2018 | Zhu ........................ G01S 17/86 |

FOREIGN PATENT DOCUMENTS

| | | | |
|---|---|---|---|
| CN | 101577287 | A | 11/2009 |
| CN | 102647552 | A | 8/2012 |
| CN | 102999152 | A | 3/2013 |
| CN | 103209291 | A | 7/2013 |
| CN | 104702933 | A | 6/2015 |
| CN | 104714840 | A | 6/2015 |
| CN | 104918034 | A | 9/2015 |
| CN | 104937928 | A | 9/2015 |
| CN | 105049829 | A | 11/2015 |
| CN | 105229697 | A | 1/2016 |
| CN | 105657222 | A | 6/2016 |
| CN | 106254738 | A | 12/2016 |
| CN | 106412433 | A | 2/2017 |
| CN | 106572340 | A | 4/2017 |
| CN | 106934394 | A | 7/2017 |
| CN | 107071339 | A | 8/2017 |
| CN | 107105217 | A | 8/2017 |
| CN | 107341481 | A | 11/2017 |
| CN | 107408201 | A | 11/2017 |
| CN | 107424187 | A | 12/2017 |
| CN | 107623814 | A | 1/2018 |
| CN | 206921118 | U | 1/2018 |
| CN | 107707831 | A | 2/2018 |

OTHER PUBLICATIONS

PCT International Preliminary Report on Patentability dated Oct. 15, 2020, issued in related International Application No. PCT/CN2018/099302, with English translation (9 pages).
PCT International Preliminary Report on Patentability dated Oct. 15, 2020, issued in related International Application No. PCT/CN2018/099303, with English translation (10 pages).
Supplemental Search dated Oct. 27, 2020, issued in related Chinese Application No. 201810278543.8 (1 page).
PCT International Search Report and the Written Opinion dated Jan. 7, 2019, issued in related International Application No. PCT/CN2018/099303, with partial English translation (9 pages).
PCT International Search Report and the Written Opinion dated Jan. 2, 2019, issued in related International Application No. PCT/CN2018/099301, with partial English translation (8 pages).
PCT International Search Report and the Written Opinion dated Jan. 10, 2019, issued in related International Application No. PCT/CN2018/099302, with partial English translation (8 pages).
First Search dated Dec. 16, 2019, issued in related Chinese Application No. 201810278543.8 (1 page).
First Office Action dated Dec. 24, 2019, issued in related Chinese Application No. 201810278543.8, with English machine translation (16 pages).
Supplemental Search dated Apr. 17, 2020, issued in related Chinese Application No. 201810278543.8 (2 pages).
Second Office Action dated Apr. 24, 2020, issued in related Chinese Application No. 201810278543.8, with English machine translation (15 pages).
Third Office Action dated Jun. 8, 2020, issued in related Chinese Application No. 201810278543.8, with English machine translation (15 pages).
First Search dated May 28, 2019, issued in related Chinese Application No. 201810278510.3 (2 pages).
First Office Action dated Jun. 4, 2019, issued in related Chinese Application No. 201810278510.3, with English machine translation (13 pages).
Second Office Action dated Aug. 9, 2019, issued in related Chinese Application No. 201810278510.3, with English machine translation (15 pages).
Supplemental Search dated Mar. 26, 2020, issued in related Chinese Application No. 201810278510.3 (1 page).
First Search dated Aug. 24, 2021, issued in related Chinese Application No. 201810278539.1 (2 pages).
First Office Action dated Sep. 1, 2021, issued in related Chinese Application No. 201810278539.1, with English machine translation (14 pages).

\* cited by examiner

| R | G | ... | | |
|---|---|-----|---|---|
| B | IR | ... | | |
| ⋮ | ⋮ | ⋱ | | |
| | | | | |
| | | | | |
| | | | | |

FIG. 6

```
Synchronously acquire a target floodlight image of
a first wavelength and a structured light image of a
second wavelength of a target area by using the
same acquisition camera
                    │
                    ▼
Recognize a foreground target in the target
           floodlight image
                    │
                    ▼
Extract a pixel area that is in the structured light image
and corresponds to the foreground target to obtain a
           target structured light image
```

FIG. 7

TARGET IMAGE ACQUISITION SYSTEM AND METHOD

CROSS REFERENCE TO RELATED APPLICATIONS

The application is a continuation application of International Patent Application No. PCT/CN2018/099303, filed with the China National Intellectual Property Administration (CNIPA) on Aug. 8, 2018, and entitled "TARGET IMAGE ACQUISITION SYSTEM AND METHOD", which is based on and claims priority to and benefit of Chinese Patent Application No. 201810278539.1, filed with the CNIPA on Mar. 31, 2018. The entire contents of all of the above-identified applications are incorporated herein by reference.

TECHNICAL FIELD

The present specification relates to acquisition of a target image, and in particular to a system and method for obtaining a target image.

BACKGROUND

Consumer depth cameras have brought changes in various fields such as 3D modeling, gesture interaction, and facial recognition. Different application scenarios have different performance requirements on a depth camera. For example, in 3D modeling, facial recognition, and the like, a depth camera usually needs to output a high resolution depth image to improve precision of modeling and a facial recognition algorithm. In gesture interaction, a depth camera needs to have a high output frame rate. A delay is reduced when a depth image has a high frame rate, thereby providing better user experience.

Currently, consumer depth cameras, especially depth cameras based on structured light technology, are faced with a number of problems, and one of which is a contradiction between a depth image resolution and an output frame rate. As a depth image resolution of a depth camera increases, an output frame rate of the depth camera decreases greatly due to an increased amount of depth computation. As a result, both a high resolution and a high frame rate cannot be implemented.

SUMMARY

The present specification provides a system and method for obtaining a target image for solving the problem in the existing technology that not both of a high resolution and a high frame rate can be implemented.

To solve the foregoing problem, the technical solutions adopted in the present specification are as follows.

In an aspect, a system for obtaining a target image includes: a floodlight illumination source, configured to provide illumination of a first wavelength for a target area; a first acquisition camera, configured to acquire a target floodlight image of the first wavelength of the target area; a structured light projector, configured to project a structured light image of a second wavelength to the target area; a second acquisition camera, configured to acquire the structured light image of the target area; and a processor, connected to the floodlight illumination source, the first acquisition camera, the structured light projector, and the second acquisition camera, and configured to: control the first acquisition camera to acquire the target floodlight image under the illumination of the floodlight illumination source; control the second acquisition camera to acquire the structured light image under the projection of the structured light projector; recognize a foreground target in the target floodlight image; and extract, based on a relative position relationship between the first acquisition camera and the second acquisition camera, a target structured light image on pixels of the structured light image, wherein the pixels correspond to the foreground target.

In an embodiment, the floodlight illumination source is a floodlight illuminator or an illumination source independent of the system for obtaining a target image.

In an embodiment, the first acquisition camera is a red-green-blue (RGB) camera, and the target floodlight image is an RGB image. The second acquisition camera is an infrared (IR) camera, and the structured light image is an IR structured light image.

In an embodiment, the first acquisition camera acquires the target floodlight image and the second acquisition camera acquires the structured light image synchronously or asynchronously.

In an embodiment, the target floodlight image is acquired by the first acquisition camera in a low resolution mode.

In an embodiment, the processor is further configured to compute a target depth image based on the target structured light image.

In another aspect, a system for obtaining a target image includes: an acquisition camera having first pixels and second pixels and being configured to respectively acquire a first wavelength image and a second wavelength image of a target area; a floodlight illumination source configured to provide illumination of a first wavelength for the target area; a structured light projector configured to project a structured light image of a second wavelength to the target area; and a processor connected to the acquisition camera, the floodlight illumination source, and the structured light projector, and configured to: control the acquisition camera to acquire a target floodlight image under the illumination of the floodlight illumination source and the structured light image under projection of the structured light projector, synchronously; recognize a foreground target in the target floodlight image; and extracting a pixel area of the structured light image that corresponds to the foreground target for obtaining a target structured light.

In another aspect, a system for obtaining a target image includes: an acquisition camera configured to acquire an image of a target area; a floodlight illumination source configured to provide illumination for the target area; a structured light projector configured to project a structured light image to the target area; and a processor connected to the acquisition camera, the floodlight illumination source, and the structured light projector, and configured to: control the acquisition camera to acquire a target floodlight image under illumination of the floodlight illumination source; recognize a foreground target in the target floodlight image; and control the acquisition camera to acquire a target structured light image on pixels corresponding to the foreground target and under projection of the structured light projector.

The present specification provides a method for obtaining a target image. The method includes: P1, synchronously or asynchronously obtaining, by a first acquisition camera and a second acquisition camera, a target floodlight image of a first wavelength and a structured light image of a second wavelength; P2, recognizing a foreground target in the target floodlight image; and P3, extracting a pixel area that is in the structured light image and corresponds to the foreground target to obtain a target structured light image. The target floodlight image is an RGB image, and the structured light image is an IR structured light image. Step P3 further includes determining a relative position relationship between the first acquisition camera obtaining the target floodlight image and the second acquisition camera obtaining the structured light image, and extracting the target structured light image based on the relative position relationship.

The method for obtaining a target image further includes the following step P4, computing a target depth image by using the target structured light image.

The beneficial effects of the system and method for obtaining a target image in present specification are as follows. The target floodlight image and the structured light image are respectively acquired by the first acquisition camera and the second acquisition camera. Then the foreground target of the target floodlight image is obtained, and the pixel area in the structured light image and corresponding to the foreground target is extracted to obtain the target structured light image. At this time, depth computation is performed on the target structured light image to obtain the target depth image. The data volume in this method is smaller than that in the case of a full resolution, and therefore an operation speed of a depth algorithm is faster, so that a high frame rate output of a depth image can be ensured.

BRIEF DESCRIPTION OF THE DRAWINGS

FIG. 6 is a schematic diagram of an image acquisition principle of an acquisition camera, according to another embodiment of the present specification.

FIG. 7 is a schematic diagram of a method for obtaining a target image, according to a third embodiment of the present specification.

The labels in the figures include: 10—processor, 11—floodlight illuminator, 12—structured light projector, 13—acquisition camera, 71—first acquisition camera, 72—structured light projector, and 73—second acquisition camera.

DETAILED DESCRIPTION OF THE APPLICATION

The following introduces the present specification in detail through specific embodiments with reference to the accompanying drawings, to better understand the present specification. However, the following embodiments do not limit the scope of the present specification. In addition, it should be noted that figures provided in the following embodiments merely describe a basic concept of the present specification in an exemplary manner. The accompanying drawings merely show components related to the present specification, instead of drawing components according to numbers, shapes, and sizes of components during actual implementation. During actual implementation, the shapes, the numbers, and proportions of the components may be changed as required, and a layout of the components may be more complex.

Figure 1:
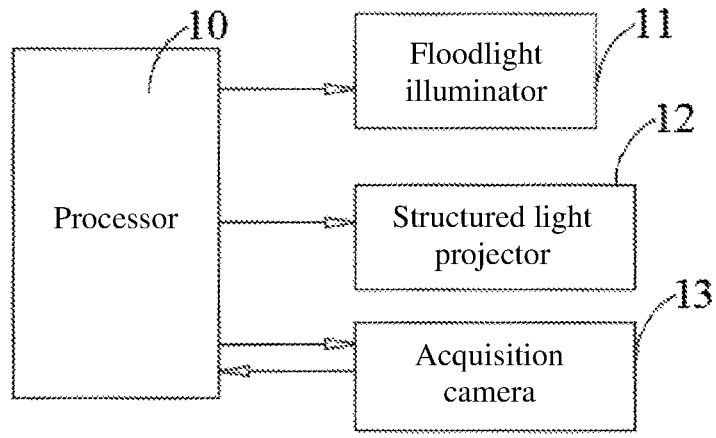
FIG. 1 is a schematic diagram of a system for obtaining a target image, according to an embodiment of the present specification.

FIG. 1 is a schematic diagram of a system for obtaining a target image, according to an embodiment of the present specification. A system for obtaining a target image includes a processor 10, a structured light projector 12 and an acquisition camera 13 that are both connected to the processor 10. The structured light projector 12 is configured to project a structured light beam into a space. When the structured light beam illuminates an object, a corresponding structured light image is formed. Then the image is acquired by the acquisition camera 13 and the structured light image of the object is formed. The processor 10 further computes a depth image based on the structured light image.

A single structured light projector 12 and a single acquisition camera 13 form a monocular structured light depth imaging system, and the processor 10 will compute the depth image based on a monocular structured light trigonometry theory. In an embodiment, the processor 10 performs matching computation on a current acquired object structured light image and a pre-stored reference structured light image, so as to obtain a deviation value of pixels between the two images, and further calculates a depth value according to the deviation value. The reference structured light image mentioned herein is obtained by the acquisition camera 13 or another acquisition camera after the structured light projector 12 projects a structured light beam on a plane placed at a known depth distance.

In some embodiments, two or more acquisition cameras 13 may be included. The acquisition cameras 13 and the structured light projector 12 form a binocular or multi-view structured light depth imaging system. An example in which two acquisition cameras 13 and a single structured light projector 12 form a binocular structured light system is used as for description. After the structured light projector 12 projects the structured light beam into the space, the two acquisition cameras 13 acquire a left structured light image and a right structured light image, respectively. Based on a binocular vision algorithm, the processor 10 may obtain the depth image by performing matching computation on the left structured light image and the right structured light image, or may obtain two depth images by performing computation on the left structured light image and a reference structured light image corresponding to the left structured light image and computation on the right structured light image and a reference structured light image corresponding to the right structured light image. The benefit is that, in an embodiment, different parameters such as different resolutions and focuses may be set for a left acquisition module and a right acquisition module. In this way, the structured light images having different resolutions, field angles, and the like may be acquired at the same time. Further, the depth images having different resolutions, field angles, and the like may be obtained. In an embodiment, multiple obtained depth images may be fused into a depth image with more information.

In some embodiments, in matching computation, with a pixel being the center, a sub-area with a particular size, for example, a sub-area with a size of 7×7 pixels or a sub-area with a size of 11×11 pixels, is selected on the current structured light image (or a reference structured light image). The reference structured light image (or the current structured light image) is then searched for a sub-area that is the most similar to the selected sub-area. A difference value between pixel coordinates of two sub-areas in two images is a deviation value. Next, according to a correspondence between the deviation value and the depth value, the depth value may be calculated based on the deviation value, and depth values of a plurality of pixels may form the depth image. A theory of performing matching computation on the left structured light image and the right structured light image or a plurality of structured light images is similar to the foregoing theory.

In some embodiments, the system for obtaining a target image further includes a floodlight illuminator 11 connected to the processor 10. The floodlight illuminator 11 is used as a floodlight illumination source to provide floodlight illumination. The processor 10 controls the floodlight illuminator 11, the structured light projector 12, and the acquisition camera 13 via a bus or the like. Or the processor 10 may be connected to the acquisition camera 13 through some data transmission interfaces such as a Mobile Industry Processor Interface (MIPI) and a video graphics array (VGA) interface, so as to receive images acquired by the acquisition camera 13. In an embodiment, the floodlight illuminator 11 and the structured light projector 12 are configured to emit light beams of the same wavelength, for example, IR light. The acquisition camera 13 includes a pixel used for acquiring the light beam of the said wavelength. The processor 10 can implement the acquisition of different images through timing control among the floodlight illuminator 11, the structured light projector 12, and the acquisition camera 13. Specifically, the processor 10 can control the acquisition camera to acquire a target floodlight image under the illumination of the floodlight illumination source, recognize a foreground target in the target floodlight image, and control the acquisition camera to acquire a target structured light image on pixels corresponding to the foreground target under the projection of the structured light projector. In some embodiments, the floodlight illumination source may be another light source in an environment. For example, ambient light may be used as the floodlight illumination. To be specific, the floodlight illumination can be active light emitted by a light source such as an IR light source or may be ambient light. Some of the following specific embodiments are described using the case in which the system includes a floodlight illuminator, and some are described using the case in which the ambient light is used as the floodlight illumination source. It should be understood that a specific form of floodlight illumination may be selected according to different cases. However, a method thereof is applicable to all the embodiments, and these embodiments are not specifically distinguished below.

The processor 10 may be executed by a depth computing processor configured in the system. The processor may be a dedicated processor such as a system-on-a-chip (SOC) and a field-programmable gate array (FPGA) or may be a general purpose processor. In some embodiments, an external computing device such as a computer, a mobile terminal or a server may be used. The external computing device receives the structured light image from the acquisition module 13 and performs depth computation, and the obtained depth image may be directly used for other applications of the device. In an embodiment, when the system is integrated into another computing terminal as an embedded device, for example, an apparatus for obtaining a target image such as a computer, a tablet, a mobile phone, and a television. Functions implemented by the processor may be completed by a processor or an application in a terminal. For example, a depth computation function is stored in a memory in the form of a software module, and is invoked by the processor in the terminal to implement the depth computation. It should be understood that the apparatus for obtaining a target image using the system for obtaining a target image provided in the present specification and/or using the method for obtaining a target image provided in the present specification falls within the protection scope of the present specification.

The structured light image may be a stripe pattern, a two-dimensional pattern, a speckle pattern (a spot pattern) or the like. A wavelength of structured light may be a visible wavelength, an IR wavelength, an ultraviolet wavelength, or the like.

Figure 2:
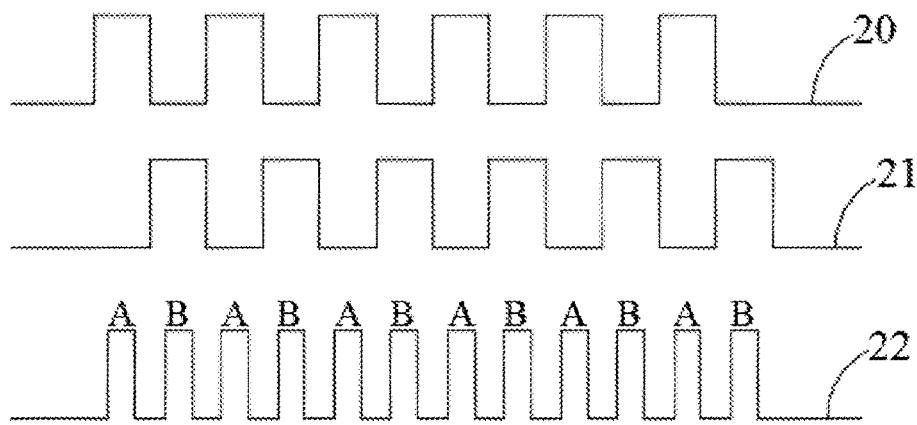
FIG. 2 is a schematic diagram of timing control of a floodlight illuminator, a structured light projector, and an acquisition camera, according to an embodiment of the present specification.

FIG. 2 is a schematic diagram of timing control of a floodlight illuminator, a structured light projector, and an acquisition camera. Timing diagrams 20, 21, and 22 correspond to the floodlight illuminator 11, the structured light projector 12, and the acquisition camera 13, respectively. A convex part in the figure represents intervals that a corresponding component is in an active state, for example, the floodlight illuminator 11 is in an illumination state, the structured light projector 12 is in a projection state, and the acquisition camera 13 is in an exposure state. It may be seen from FIG. 2 that, in this embodiment, the processor 10 controls the floodlight illuminator 11 and the structured light projector 12 to be alternately activated, and controls the acquisition camera to perform exposure at each activation interval and acquire a corresponding image. A floodlight image A is acquired under the illumination of the floodlight illuminator 11. A structured light image B is acquired under the projection of the structured light projector 12. The floodlight image A and the structured light image B are sequentially output to the processor for processing. In some embodiments, higher quality images are acquired by appropriately setting an activation time of the floodlight illuminator 11 and an activation time of the structured light projector 12. For example, a longer activation time is set for the structured light projector 12 to ensure a sufficient exposure time to acquire a structured light image with higher quality. In some embodiments, an activation sequence of the floodlight illuminator 11 and the structured light projector 12 may be set differently according to actual application requirements. For example, the structured light projector 12 will be activated once after the floodlight illuminator 11 has been activated twice.

In some applications, it is required to obtain a high resolution depth image of a measured object. However, due to the limitation of a depth computing algorithm and the computing power of the processor, acquisition of the high resolution depth image often requires relatively high costs.

Figure 3:
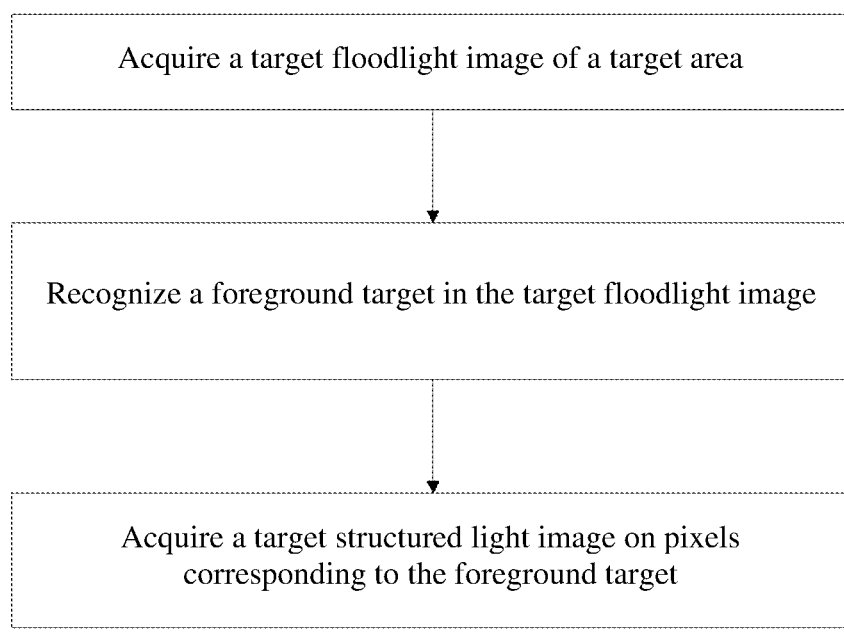
FIG. 3 is a schematic diagram of a method for obtaining a target image, according to an embodiment of the present specification.

In an implementation of the present specification, a method for obtaining a target depth image with a high resolution is provided based on the system shown in FIG. 1. FIG. 3 is a schematic diagram of a method for obtaining a target image, according to an embodiment of the present specification. The method is performed by the processor 10 to implement corresponding functions.

First, the acquisition camera 13 is controlled to acquire a target floodlight image under the illumination of the floodlight illumination source. The target floodlight image mentioned herein is a floodlight image including a target. In the existing technology, a resolution of a depth image output by a depth camera such as Microsoft Kinect or Intel realsense is usually a VGA resolution, that is, 640×480, or a lower resolution. Therefore, a high resolution of 1280×960 is used as an example for description in the present specification. It should be understood that other resolutions are also applicable to the present specification. In this step, the processor 10 applies a synchronous trigger signal to the floodlight illuminator 11 and the acquisition camera 13, so as to control the acquisition camera 13 to acquire the floodlight image A of a target area when the floodlight illuminator 11 provides the floodlight illumination. In this case, the acquisition camera 13 may have a full resolution output, that is, an output of the floodlight image A of a 1280×960 resolution. In an embodiment, the acquisition camera 13 may be controlled to obtain a low resolution image of a full field of view with a low resolution mode including a binning mode, a skipping mode, or the like. On the premise that an output frame rate is high and a transmission speed of an output interface is constant, if the full resolution image cannot implement an output at a high frame rate, the low resolution output mode can be used.

Generally, the floodlight image includes both a foreground target of interest such as a face, a human body, or an object, and some background targets such as a scene around a person. In terms of some applications such as facial recognition and 3D modeling, usually only the foreground target information is needed, while a background needs to be removed.

Next, a foreground target in the target floodlight image is recognized. In this step, a foreground and a background in the floodlight image need to be segmented. Various image segmentation algorithms such as threshold segmentation, mean shift, and clustering may be applied to this step. Both computation efficiency and computation precision need to be considered to select an image segmentation algorithm, especially the computation efficiency. If an image segmentation speed is slow, a final output frame rate of an image (an output frame rate of a depth image) will be reduced. A foreground area is recognized after being segmented. In other words, a foreground pixel area in which the foreground area is located is recognized.

Finally, the acquisition camera is controlled to acquire a target structured light image on pixels corresponding to the foreground target under the projection of the structured light projector. Because the foreground pixel area is obtained in the previous step, in this step, the acquisition camera will only sample pixels corresponding to the foreground area in a cropping mode. That is, the acquisition camera only outputs a foreground image corresponding to the foreground area. The structured light projector is turned on at this time. Therefore, the obtained foreground image is the target structured light image. It should be noted that for a dynamic target such as a moving human body, pixels corresponding to a target may be different between two sequential images. Therefore, when selecting the pixels corresponding to the foreground area, a pixel area may be appropriately enlarged according to a moving speed of a human body and parameters of a camera. In fact, in the case of a high frame rate (for example, 30 fps or 60 fps), the foreground areas in sequential frames of image are nearly the same.

After the above steps, the processor 10 obtains a target structured light image required for a current application. The target structured light image may only include a small field angle but has a high resolution.

Figures 4, 5:
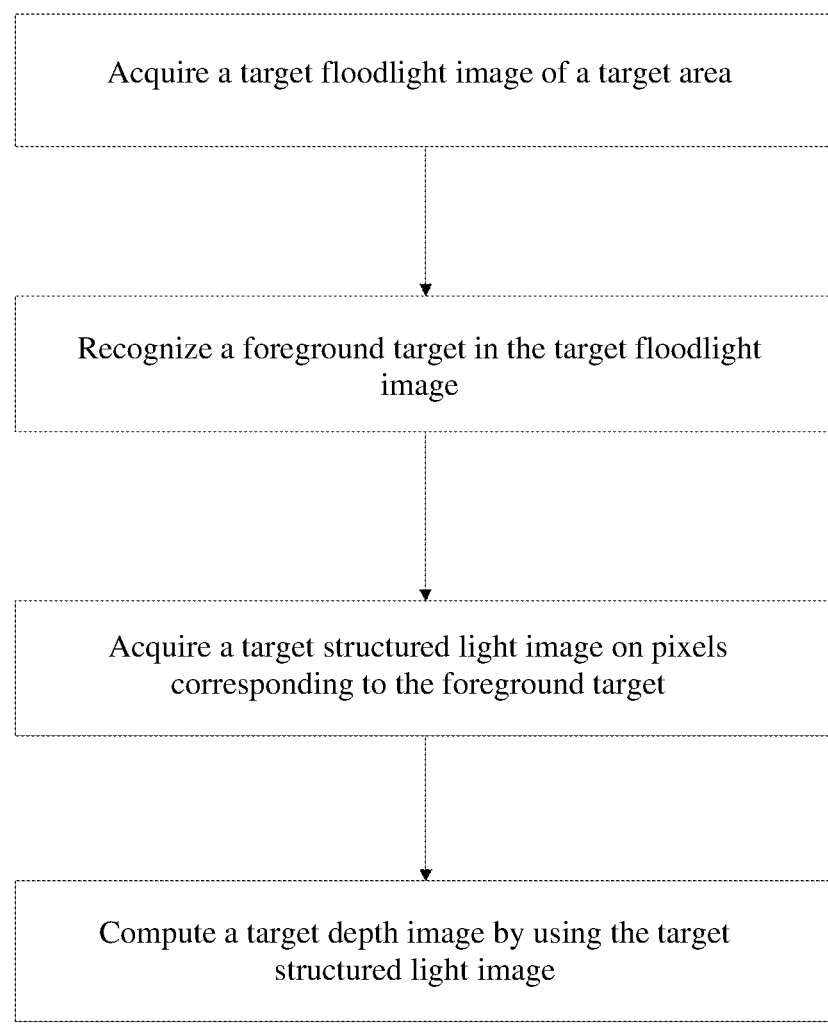
FIG. 4 is a schematic diagram of a method for obtaining a target image, according to a second embodiment of the present specification.
FIG. 5 is a schematic diagram of an image acquisition principle of an acquisition camera, according to an embodiment of the present specification.

As shown in FIG. 4, in a variant embodiment of the present specification, a target depth image is obtained by performing depth computation based on the target structured light image. The data volume is smaller than that in the case of a full resolution, therefore an operation speed of a depth algorithm is faster, so that a high frame rate output of a depth image can be ensured.

Now, the above steps are described in a more intuitive embodiment. For example, the acquisition camera can output an image of up to 1280×960@60 fps. If the acquisition camera is used to acquire a structured light image, due to the limitation of the depth computing algorithm and hardware, only a depth image of 1280×960@10 fps can be output. A frame rate of a depth image is too low to satisfy requirements of some applications. When the foregoing method is used, that is, the floodlight illuminator and the structured light projector are turned on at alternate timings, the acquisition camera can obtain a floodlight image of 1280×960@30 fps. In combination with a high speed image segmentation algorithm, after the foreground target area is recognized (assuming that the target area is located in the middle of a field angle of the acquisition camera and occupies 50% of the entire field of view), a target structured light image of 640×480@30 fps may be obtained. Processing may be performed on the target structured light image of 640×480@30 fps in real time according to the current depth computing algorithm and related hardware, and a depth image of 640×480@30 fps is output. Compared with direct use of the acquisition camera of 640×480@30 fps, the depth image obtained in this embodiment only includes a target and has more detailed information, and an image segmentation step can be omitted.

In the embodiments shown in FIG. 2, FIG. 3, and FIG. 4, the floodlight illuminator 11 and the structured light projector 12 project light beams of the same wavelength, and the acquisition camera is configured to respectively obtain the floodlight image A and the structured light image B at different timings.

FIG. 5 and FIG. 6 are schematic diagrams of an acquisition principle of an acquisition camera, according to an embodiment of the present specification. In FIG. 5, the acquisition camera may include a W pixel sensitive to white light (light of all wavelengths) and an IR pixel sensitive to IR light, so as to synchronously acquire light beams of two wavelengths. When the floodlight illumination source is ambient light, and the structured light projector is configured to project IR structured light, the acquisition camera may acquire both the floodlight image and the structured light image, but effective pixels of the floodlight image and the structured light image are fewer than all pixels of the acquisition camera. In this embodiment, the effective pixels are half of all the pixels. In other embodiments, the pixels of the floodlight image and the pixels of the structured light may be in other proportions, for example, W:IR=1:3, to ensure that the structured light image has more image details, and the obtained depth image has more detailed information. In FIG. 6, the acquisition camera may acquire both a color image (RGB) and an IR image, for example, may acquire both a color floodlight image and an IR structured light image or both a color structured light image and an IR floodlight image.

It should be understood that FIG. 5 and FIG. 6 are merely examples for describing that when the wavelengths of the light beams emitted by the floodlight illuminator 11 and the structured light projector 12 are different, an acquisition camera sensitive to both wavelengths may be used to acquire both a target floodlight image and a structured light image corresponding to different wavelengths. Real cases are not limited to the examples shown in FIG. 5 and FIG. 6. FIG. 7 is a schematic diagram of a method for obtaining a target image based on that an acquisition camera acquires both a target floodlight image and a structured light image of different wavelengths. The method is performed by the processor 10 to implement corresponding functions.

First, the acquisition camera is controlled to respectively acquire a target floodlight image under the illumination of the floodlight illuminator 11 and a structured light image under the illumination of the structured light projector 12. The floodlight illuminator 11 and the structured light projector 12 may be in the on state all the time, or may be turned on with a frequency and emit light at a particular pulse interval. The frequency should be consistent with an exposure frequency of the acquisition camera. Assuming that the acquisition camera may output an image of 1280×960@30 fps, under both the illumination of the floodlight illuminator and the illumination of the structured light projector, each obtained image includes information of a target floodlight image and information of a structured light image. For the acquisition camera shown in FIG. 5, the information of the floodlight image occupies half of each image, and the information of the structured light image occupies the other half. The acquisition camera may then separately extract pixels corresponding to the floodlight image and the structured light image, fill in other blank pixels according to an upsampling algorithm, and finally obtain a floodlight image of 1280×960@30 fps and a structured light image of 1280×960@30 fps. There is no parallax between the floodlight image and the structured light image.

Next, a foreground target in the target floodlight image is recognized. In this step, a foreground and a background in the floodlight image need to be segmented. Various image segmentation algorithms such as threshold segmentation, mean shift, and clustering may be applied to this step. Both computation efficiency and computation precision need to be considered to select an image segmentation algorithm, especially the computation efficiency. If an image segmentation speed is slow, a final output frame rate of an image (an output frame rate of a depth image) will be reduced. A foreground area is recognized after being segmented. In other words, a foreground pixel area in which the foreground area is located is recognized.

Finally, a pixel area in the structured light image and corresponding to the foreground target is extracted to obtain a target structured light image. Because there is no parallax between the target floodlight image and the structured light image, the foreground area in the target floodlight image recognized in the previous step is also the foreground area in the structured light image. Pixels of the structured light image extracted from the area are the target structured light image.

After the above steps, the processor 10 can obtain the target structured light image required for the current application. The target structured light image only includes a small field angle but has a high resolution.

Figure 8:
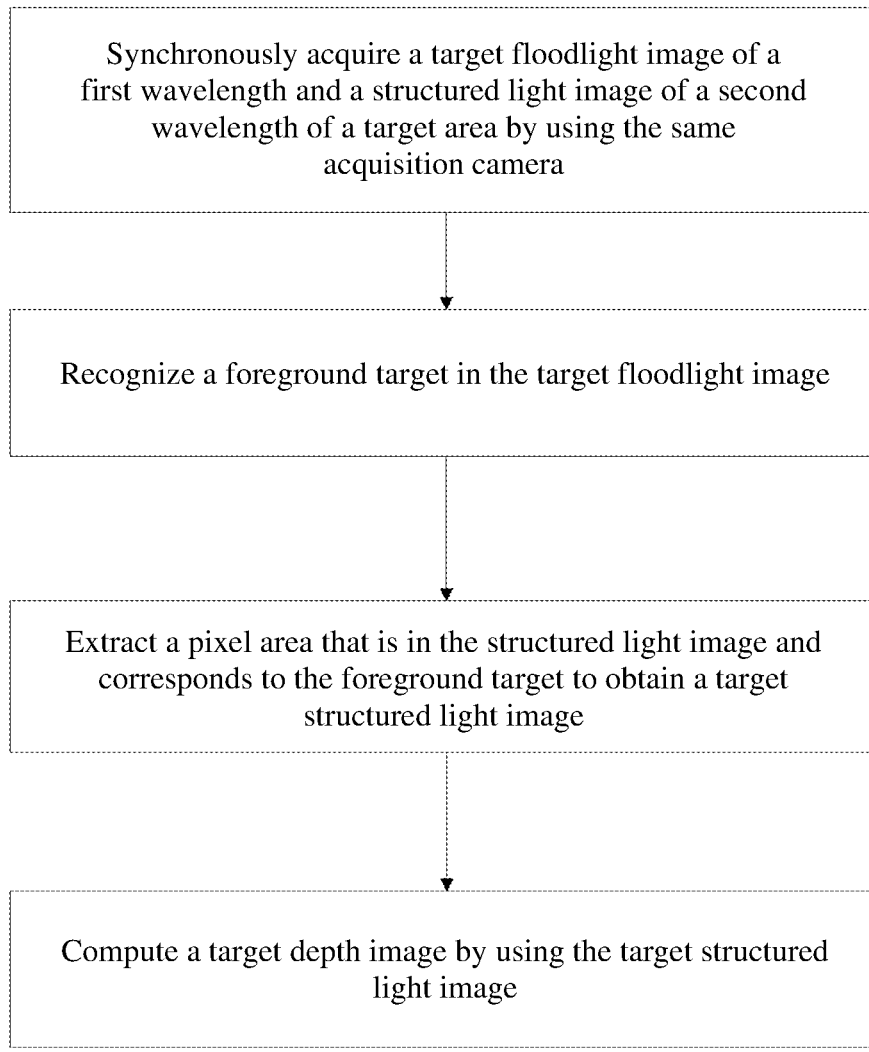
FIG. 8 is a schematic diagram of a method for obtaining a target image, according to a fourth embodiment of the present specification.

As shown in FIG. 8, in a variant embodiment of the present specification, a target depth image is obtained by performing depth computation based on the target structured light image. A data volume is smaller than that in the case of a full resolution, therefore an operation speed of a depth algorithm is faster, so that a high frame rate output of a depth image can be ensured.

Comparing the methods shown in FIG. 7 and FIG. 8 with the methods shown in FIG. 3 and FIG. 4, there is a time difference between the target floodlight image and the structured light image in the methods shown in FIG. 3 and FIG. 4. When a target is a moving object and a moving speed is fast, it may cause the algorithm fail. The target floodlight image and the structured light image in the methods shown in FIG. 7 and FIG. 8 are obtained synchronously. Therefore, the method can adapt to a fast moving object. However, the structured light image acquired by the acquisition camera only includes some pixels, and therefore some detail information of the obtained depth image may be lost.

Figure 9:
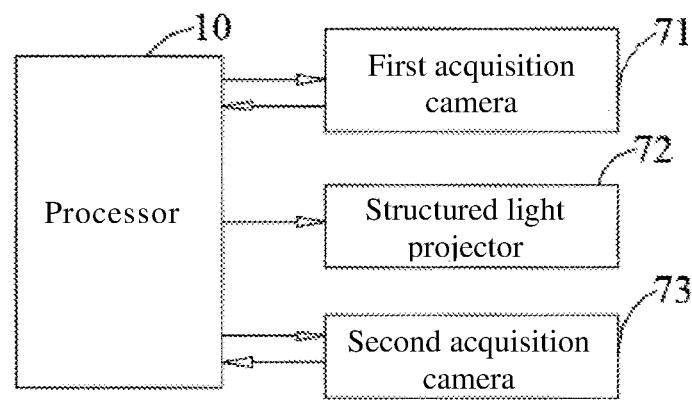
FIG. 9 is a schematic diagram of a system for obtaining a target image, according to another embodiment of the present specification.

FIG. 9 is a schematic diagram of a system for obtaining a target image, according to another embodiment of the present specification. The system for obtaining a target image includes a processor 10, a first acquisition camera 71, a second acquisition camera 73, a structured light projector 72, and a floodlight illumination source that are connected to the processor 10. The floodlight illumination source in the system uses ambient light and is not shown in the figure. The first acquisition camera 71 and the second acquisition camera 73 are configured to separately acquire images of different wavelengths. In an embodiment, the first acquisition camera is configured to acquire a target floodlight image of a first wavelength of a target area. The second acquisition camera is configured to acquire a structured light image of the target area. It should be understood that in an embodiment, a floodlight illuminator or an illumination source independent of the system for obtaining a target image may be included. An example in which ambient light is used as floodlight is used for description below.

Figure 10:
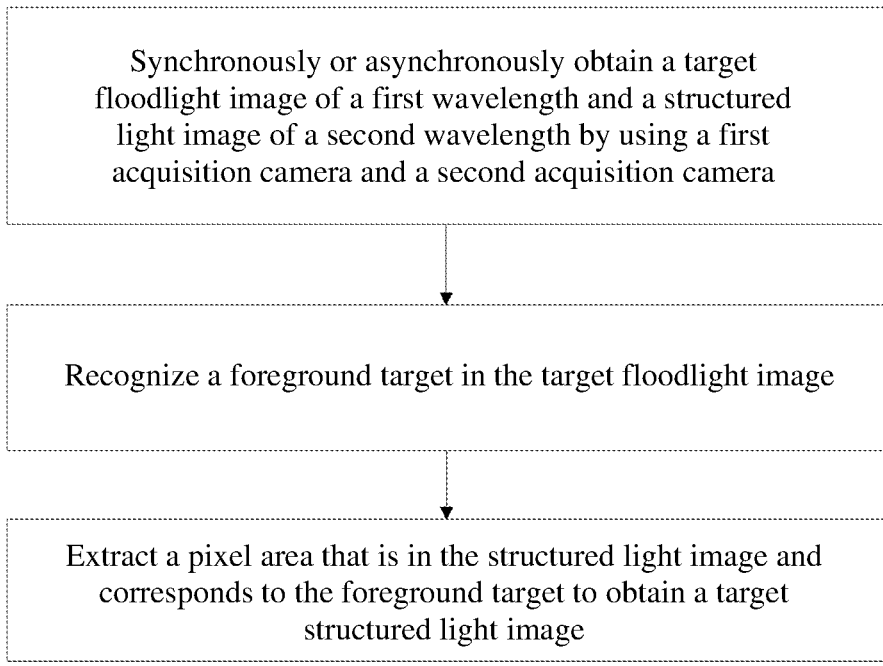
FIG. 10 is a schematic diagram of a method for obtaining a target image, according to a fifth embodiment of the present specification.

In an embodiment, the first acquisition camera is an RGB camera, and is configured to acquire an RGB image. The second acquisition camera is an IR camera, and is configured to acquire an IR image. The structured light projector is configured to emit an IR structured light image. Because there is parallax between the RGB camera and the IR camera, the two cameras need to be calibrated. Any calibration method in the existing technology may be used to calibrate the cameras. The objective of the calibration is to obtain a relative position relationship between one camera and the other camera (translation and placement matrices, R and T). FIG. 10 is a schematic diagram of a method for obtaining a target image, according to another embodiment of the present specification. The method is performed by the processor 10 to implement corresponding functions.

First, an RGB camera and an IR camera are controlled to obtain an RGB image and an IR structured light image. The processor 10 controls the RGB camera and the IR camera to extract the RGB image and the IR structured light image at the same frame rate. Resolutions of the RGB image and the IR image may be the same or different. Generally, the RGB camera in the system needs to be used to execute a photographing task or the like. Therefore, the RGB image has a higher resolution. However, in this embodiment, the RGB image acquired by the RGB camera is used for an application to recognize a foreground target. Therefore, the RGB image may be acquired in a low resolution mode (i.e., a resolution lower than a full resolution of the camera). In this way, a frame rate of an obtained image can be increased, and the difficulty of the subsequent foreground target recognition can be reduced.

Next, a foreground target in the RGB image is recognized. In this step, a foreground and a background in the RGB image need to be segmented. Various image segmentation algorithms such as threshold segmentation, mean shift, and clustering may be applied to this step. Both computation efficiency and computation precision need to be considered to select an image segmentation algorithm, especially the computation efficiency. If an image segmentation speed is slow, a final output frame rate of an image (an output frame rate of a depth image) will be reduced. A foreground area is recognized after being segmented. In other words, a foreground pixel area in which the foreground area is located is recognized.

Finally, a target structured light image on pixels corresponding to the foreground target and on the IR structured light image is extracted based on a relative position relationship between the RGB camera and the IR camera. After an area in which the foreground target is located is determined in the RGB image, the area in which the corresponding foreground target is located in the target structured light image may be positioned according to the relative position relationship between the RGB camera and the IR camera, and pixels in the area may be extracted as the target structured light image.

Figure 11:
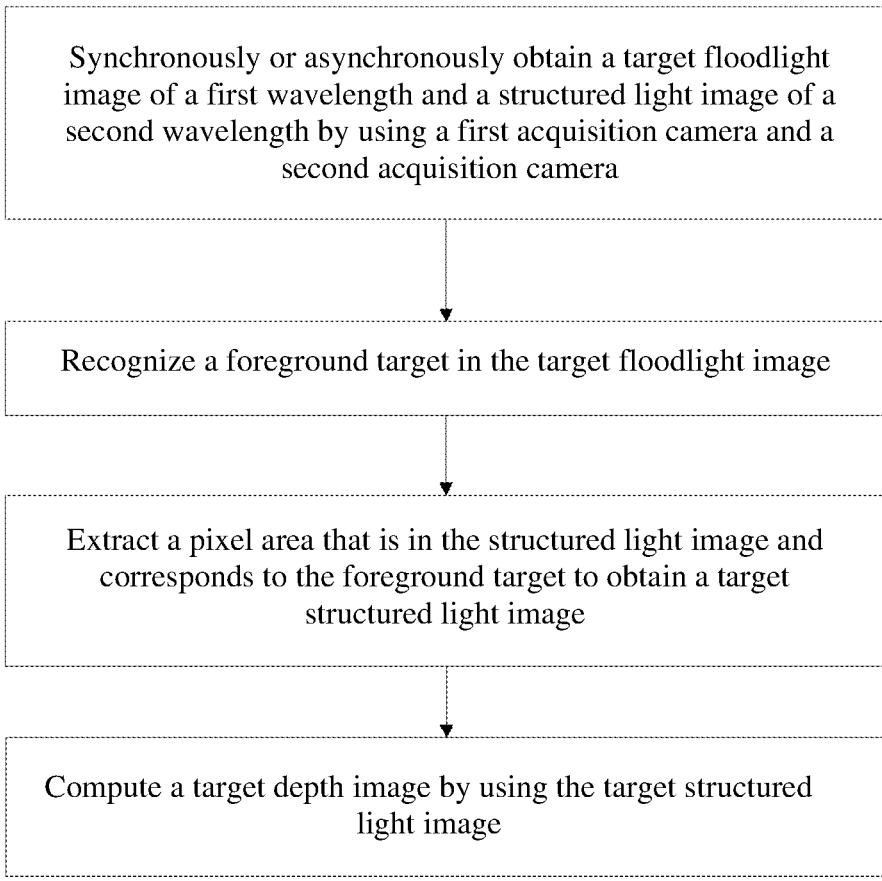
FIG. 11 is a schematic diagram of a method for obtaining a target image, according to a sixth embodiment of the present specification.

As shown in FIG. 11, after the processor 10 acquires the target structured light image for the current application in the foregoing steps, a depth value of each pixel of the target structured light image is calculated by using a depth algorithm to generate a target depth image. In this embodiment, the total number of pixels in the final target structured light image is small, so that depth computation may be operated in real time, thereby implementing a high frame rate output. In the step of acquiring the RGB image and the IR image, the RGB image and the IR image may be obtained asynchronously. A manner similar to that in the embodiments shown in FIG. 3 and FIG. 4 may be used to acquire the RGB image and the IR image separately at a particular timing. In this case, requirements on storage and operation power of the processor 10 can be reduced. In a timing acquisition mode, the IR camera may recognize a foreground target area in the RGB image, and an IR structured light image is acquired in a cropping mode. Therefore, a data volume may further be reduced to ensure a high speed output.

The foregoing content further describes the present specification in detail with reference to specific embodiments, and does not construe a limitation on the embodiments of the present specification. A person of skill in the art may make equivalent replacements or obvious variations having same performance or functions as those in the present specification without departing from the principle of the present specification, and the replacements or variations fall within the protection scope of the present specification.

What is claimed is:

1. A system for obtaining a target image, comprising:
   a floodlight illumination source configured to provide illumination of a first wavelength for a target area;
   a first acquisition camera having a camera resolution and configured to acquire a target floodlight image of the first wavelength from the target area;
   a structured light projector configured to project a structured light beam of a second wavelength, different from the first wavelength, to the target area;
   a second acquisition camera configured to acquire a structured light image of the second wavelength from the target area; and
   a processor connected to the floodlight illumination source, the first acquisition camera, the structured light projector, and the second acquisition camera, and configured to:
      control the first acquisition camera to acquire the target floodlight image under the illumination of the floodlight illumination source, wherein the target floodlight image has a first resolution lower than the camera resolution;
      recognize a foreground target in the target floodlight image, and obtain a foreground target area corresponding to the foreground target in the target floodlight image, wherein the foreground target area is smaller than the target area;
      control the second acquisition camera to acquire a structured light image of the obtained foreground target area under projection of the structured light projector; and
      extract, based on a relative position relationship between the first acquisition camera and the second acquisition camera, a target structured light image on pixels of the structured light image of the obtained foreground target area, wherein the pixels correspond to the foreground target in the foreground target area.

2. The system according to claim 1, wherein the floodlight illumination source comprises a floodlight illuminator independent of the system.

3. The system according to claim 1, wherein the first acquisition camera comprises a red-green-blue (RGB) camera, and the target floodlight image comprises an RGB image; and the second acquisition camera comprises an infrared (IR) camera, and the structured light image comprises an IR structured light image.

4. The system according to claim 1, wherein the processor is further configured to compute a target depth image based on the target structured light image of the foreground target area.

5. A system for obtaining a target image, comprising:
   an acquisition camera having first pixels and second pixels, having a camera resolution, and being configured to respectively acquire a first wavelength image and a second wavelength image from a target area;
   a floodlight illumination source configured to provide illumination of a first wavelength for the target area;
   a structured light projector configured to project a structured light beam of a second wavelength, different from the first wavelength, to the target area; and
   a processor connected to the acquisition camera, the floodlight illumination source, and the structured light projector, and configured to:
   control the acquisition camera to acquire a target floodlight image under the illumination of the floodlight illumination source, wherein the target floodlight image has a first resolution lower than the camera resolution;
   recognize a foreground target in the target floodlight image, and obtain a foreground target area corresponding to the foreground target in the target floodlight image, wherein the foreground target area is smaller than the target area;
   control the acquisition camera to acquire a structured light image of the obtained foreground target area under projection of the structured light projector; and extract a pixel area of the structured light image that corresponds to the foreground target for obtaining a target structured light image.

6. The system according to claim 5, wherein the floodlight illumination source comprises a floodlight illuminator independent from the system.

7. The system according to claim 5, wherein the first wavelength comprises a wavelength of visible light, and the second wavelength comprises a wavelength of infrared (IR) light.

8. The system according to claim 7, wherein the target floodlight image comprises a color image or a gray image.

9. The system according to claim 5, wherein the floodlight illumination source and the structured light projector are turned on all the time or with a certain frequency, and the frequency is consistent with an exposure frequency of the acquisition camera.

10. The system according to claim 5, wherein pixels of the acquired target floodlight image and pixels of the acquired structured light image are different.

11. The system according to claim 5, wherein the processor is further configured to compute a target depth image based on the target structured light image of the foreground target area.

12. A system for obtaining a target image, comprising:
an acquisition camera having a camera resolution and configured to acquire an image from a target area;
a floodlight illumination source configured to provide illumination for the target area;
a structured light projector configured to project a structured light beam to the target area; and
a processor connected to the acquisition camera, the floodlight illumination source, and the structured light projector, and configured to:
control the acquisition camera to acquire a target floodlight image under illumination of the floodlight illumination source, wherein the target floodlight image has a first resolution lower than the camera resolution;
recognize a foreground target in the target floodlight image; and
control the acquisition camera to acquire a target structured light image on pixels corresponding to the foreground target and under projection of the structured light projector in a cropping mode.

13. The system according to claim 12, wherein the floodlight illumination source comprises a floodlight illuminator independent from the system.

14. The system according to claim 12, wherein the floodlight illumination source and the structured light projector are activated alternately, and wherein the acquisition camera exposes and acquires the target floodlight image or the target structured light image during activation intervals of the floodlight illumination source or the structured light projector.

15. The system according to claim 14, wherein an activation interval of the structured light projector is longer than an activation interval of the floodlight illumination source.

16. The system according to claim 12, wherein the processor is further configured to compute a target depth image based on the target structured light image of the foreground target area.

* * * * *